(12) United States Patent
Yang et al.

(10) Patent No.: US 8,110,520 B2
(45) Date of Patent: Feb. 7, 2012

(54) CARBON-COATED METAL OXIDE NANO-PARTICLES AND METHOD OF PREPARING THE SAME

(75) Inventors: Chia-Min Yang, Hsinchu (TW);
Yu-Chuan Hsu, Hsinchu (TW);
Huang-Ching Lin, Hsinchu (TW);
Yi-Ting Liao, Hsinchu (TW);
Chien-Wei Lue, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 362 days.

(21) Appl. No.: 12/290,157

(22) Filed: Oct. 27, 2008

(65) Prior Publication Data

US 2010/0035750 A1 Feb. 11, 2010

(30) Foreign Application Priority Data

Aug. 5, 2008 (TW) .............................. 97129714 A

(51) Int. Cl.
*B01J 31/00* (2006.01)
(52) U.S. Cl. ........ 502/159; 502/100; 502/150; 427/333; 427/340; 427/372.2; 977/773

(58) Field of Classification Search .................. 502/100, 502/150, 159; 427/333, 340, 372.2; 977/773
See application file for complete search history.

(56) References Cited

U.S. PATENT DOCUMENTS

| 5,830,602 | A | * | 11/1998 | Barker et al. | ............... 429/218.1 |
| 6,759,362 | B2 | * | 7/2004 | Job | ............... 502/113 |
| 2006/0098389 | A1 | * | 5/2006 | Liu et al. | ............... 361/502 |
| 2006/0115411 | A1 | * | 6/2006 | Jensen et al. | ............... 423/611 |
| 2008/0085962 | A1 | * | 4/2008 | Simone et al. | ............... 524/403 |
| 2009/0074655 | A1 | * | 3/2009 | Suciu | ............... 423/608 |

* cited by examiner

*Primary Examiner* — Melvin Mayes
*Assistant Examiner* — Melissa Stalder
(74) *Attorney, Agent, or Firm* — J.C. Patents

(57) ABSTRACT

A method of preparing carbon-coated metal oxide nano-particles and carbon-coated metal oxide nano-particles prepared with the same method are described. The method includes the following steps at least. A precursor of a polymer is polymerized on metal oxide nano-particles to form polymer-coated metal oxide nano-particles. Then, pyrolysis is conducted to carbonize the polymer coated on the metal oxide nano-particles, so as to form carbon-coated metal oxide nano-particles.

23 Claims, 3 Drawing Sheets

CARBON-COATED METAL OXIDE NANO-PARTICLES AND METHOD OF PREPARING THE SAME

CROSS-REFERENCE TO RELATED APPLICATION

This application claims the priority benefit of Taiwan application serial no. 97129714, filed Aug. 5, 2008. The entirety of the above-mentioned patent application is hereby incorporated by reference herein and made a part of this specification.

BACKGROUND OF THE INVENTION

1. Field of the Invention

This invention relates to a nano-technology, and in particular to carbon-coated metal oxide nano-particles and a method of preparing the same. The carbon-coated metal oxide nano-particles may be used as, for example, a photocatalyst.

2. Description of Related Art

Among all the functional materials to be synthesized on the nano-scale, metal oxides are particularly attractive candidates, from a scientific point and a technological point of view. The unique characteristics of metal oxides make them the most diverse class of materials, with properties covering almost all aspects of material science. The great variety of structures makes them the primary target in solid-state chemistry and provides the basis for designing new materials. In addition, metal oxide materials exhibit fascinating electronic and magnetic properties, including metallic or insulating and ferro-, ferri- or antiferromagnetic behavior. All these properties make metal oxides a vital constituent in technological applications like gas sensing, electroceramics, catalysis, energy conversion, data storage and so on. Among them, oxides of titanium, tin, iron and other metals that possess moderate band gaps can absorb visible to ultra-violet light to proceed photochemical reactions, such that these materials can serve as photocatalysts.

Some of these metal oxide photocatalysts are commonly used in daily life, and their potential in photochemical elimination/decomposition of organic pollutants for environmental purpose and in photovoltaics and solar energy utilization are widely recognized and are intensively studied worldwide.

A conventional method of preparing a metal oxide nano-structure is the aqueous sol-gel technique using a suitable precursor, but this technique has difficulties in reducing the particle size and controlling the reaction condition. Therefore, in recent years, the non-aqueous sol-gel technique is also adopted.

On the other hand, coating a layer of carbon on the surface of a nano-metal oxide photocatalyst can effectively improve the crystallinity stability, optical activity and the performance in adsorbing dye molecules or contaminants. In the conventional method of preparing carbon-coated metal oxide nano-particles, already formed metal oxide nano-particles and a polymer are mixed, and then high-temperature pyrolysis is conducted to carbonize the polymer on the nano-particles. However, the thickness of the carbon coating formed with the above method is usually not uniform, and the carbon content of the nano-particles is difficult to control.

SUMMARY OF THE INVENTION

Accordingly, this invention provides a method of preparing carbon-coated metal oxide nano-particles, so as to solve the problems in the prior art.

This invention also provides carbon-coated metal oxide nano-particles prepared by the above method of this invention.

The preparing method includes the following steps at least. A precursor of a polymer is polymerized on metal oxide nano-particles to form polymer-coated metal oxide nano-particles, wherein the metal oxide contains one or more metals. Pyrolysis is then conducted to carbonize the polymer coated on the metal oxide nano-particles.

In some embodiments, forming the polymer-coated metal oxide nano-particles includes the following steps. A precursor of the metal oxide and the precursor of the polymer are uniformly dispersed in a solvent to form a solution. Then, the solution is heated to cause reaction, such that the precursor of the polymer is polymerized on the just formed metal oxide nano-particles to form the polymer. The preparing method further includes separating the polymer-coated metal oxide nano-particles from the solution after the polymer-coated metal oxide nano-particles are formed.

In some embodiments, the solvent is an organic solvent selected from the group consisting of alcohols, aldehydes, ketones and ethers.

In some embodiments, in the step of heating the solution, a by-product capable of initiating the polymerization of the precursor of the polymer is formed. The by-product is, for example, an acid. The precursor of polymer that can be polymerized with acid-catalysis may be selected from saccharides and furfuryl alcohol.

The metal may be selected from the group consisting of main group metals and transition metals. The precursor of the metal oxide may be selected from the group consisting of inorganic metal salts and mixtures of inorganic metal salt and organometallic complex. The inorganic metal salts may include $TiCl_4$, $Ti(SO_4)_2$, $TiOSO_4$, $VOCl_3$, $FeCl_3$, $Fe(NO_3)_3$, $CoCl_2$, $NbCl_5$, $SnCl_4$, $WCl_6$ and $Pb(NO_3)_2$. The organometallic complex may be selected from the group consisting of $Ti(OEt)_4$, $Ti(OnPr)_4$, $Ti(OiPr)_4$, $Ti(OnBu)_4$, $Fe(acac)_3$, $Cu(CH_3OO)_2$, $Zn[OC(C_2H_5)_3]_2$, $Zr(OnPr)_4$, $Zr(OtBu)_4$, $Zr(OiPr)_4$, $Nb(OEt)_5$, $In(acac)_3$, $Sn(OtBu)_4$ and $Pb(acac)_2$.

In some embodiments, it is possible to further uniformly disperse a dopant precursor in the solvent together with the precursor of the metal oxide and the precursor of the polymer, such that the carbon-coated metal oxide nano-particles prepared are doped with heteroatoms. The dopant precursor may be selected from the group consisting of precursors of non-metal dopants and precursors of metal dopants. The precursors of metal dopants may include elemental metals, inorganic metal salts and organometallic complexes. The elemental metals may include Ba, Li and Sr. The inorganic metal salts may include $TiCl_4$, $Ti(SO_4)_2$, $TiOSO_4$, $VOCl_3$, $FeCl_3$, $Fe(NO_3)_3$, $CoCl_2$, $NbCl_5$, $SnCl_4$, $WCl_6$, $Pb(NO_3)_2$, $H_2PtCl_6$ and $RuCl_3$. The organometallic complexes may include $Ti(OEt)_4$, $Ti(OnPr)_4$, $Ti(OiPr)_4$, $Ti(OnBu)_4$, $Fe(acac)_3$, $Cu(CH_3OO)_2$, $Zn[OC(C_2H_5)_3]_2$, $Zr(OnPr)_4$, $Zr(OtBu)_4$, $Zr(OiPr)_4$, $Nb(OEt)_5$, $In(acac)_3$, $Sn(OtBu)_4$, and $Pb(acac)_2$. The precursors of non-metal dopants may include non-metal elements and non-metal compounds. The non-metal elements may include iodine and sulfur. The non-metal compounds may include acetic acid, $H_3PO_4$, $H_3PO_3$, $H_3PO_2$, $HIO_3$, $NH_4F$, $HF$, $CO(NH_2)_2$ and $CS(NH_2)_2$.

The pyrolysis process may be performed in a high vacuum or an inert environment. The environmental gas in the inert environment may be selected from $N_2$, He and Ar. In addition, the pyrolysis process may be performed under a pressure of $10^{-5}$-$10^{-1}$ atm at a temperature of 300-1500° C.

In some embodiments, the carbon content of the carbon-coated metal oxide nano-particles is in the range of 0.1-20 wt %. In some embodiments, the surface area of the carbon-coated metal oxide nano-particles is in the range of 30-300 $m^2g^{-1}$.

In some embodiments, the carbon-coated metal oxide nano-particles are used as a photocatalyst.

The carbon-coated metal oxide nano-particles of this invention are prepared by the above method of preparing carbon-coated metal oxide nano-particles.

Since the precursor of polymer is polymerized on the surface of each metal oxide nano-particle to form a polymer coating, the thickness of the polymer coating is quite uniform so that the thickness of the carbon coating formed with carbonization is also quite uniform. Thereby, the carbon content of the nano-particles is easier to control, and the size and shape of the same are not easily changed. Further, in an embodiment where a polymer is coated on the metal oxide nano-particles just formed in the solution, growth of the nano-particles is inhibited due to the isolation of the polymer. Thereby, the size of the carbon-coated metal oxide nano-particle is reduced and the surface area of the same is increased.

In order to have a further understanding of the above and the other objectives, the features, and the advantages of this invention, a detailed description is given with the embodiments and the accompanying drawings as follows.

DESCRIPTION OF THE EMBODIMENTS

Figure 1:
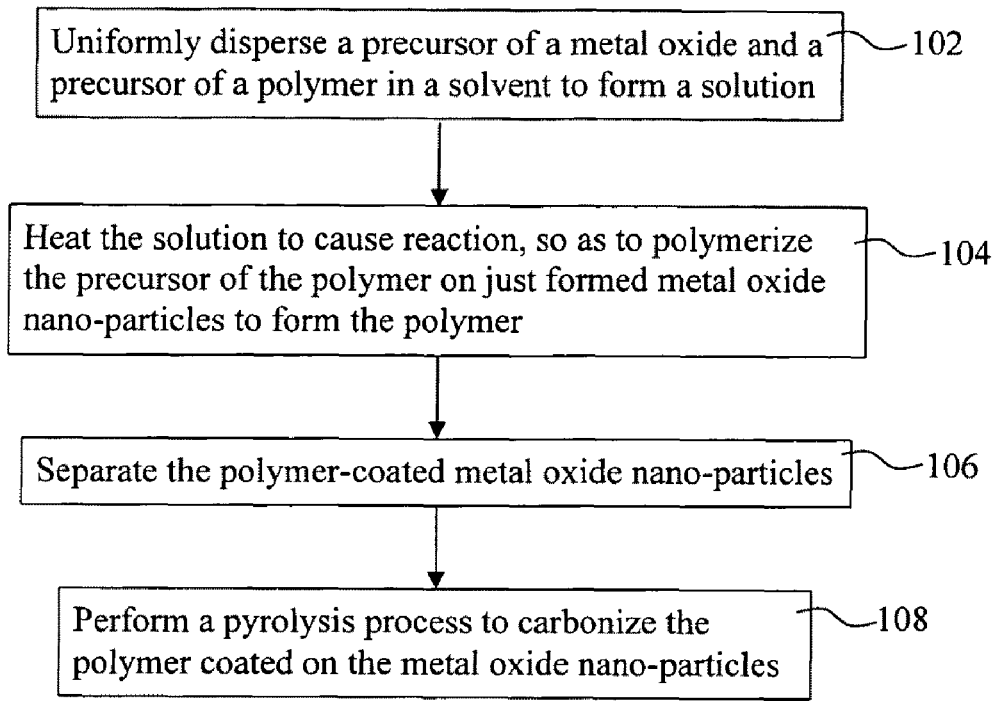
FIG. 1 is a flow chart illustrating a method of preparing carbon-coated metal oxide nano-particles according to an embodiment of this invention.

FIG. 1 is a flow chart illustrating a method of preparing carbon-coated metal oxide nano-particles according to an embodiment of this invention.

Referring to FIG. 1, a precursor of a metal oxide and a precursor of a polymer are uniformly dispersed in a solvent to form a solution (step 102). The metal oxide may contain one or more metals, which may be selected from the group consisting of main group metals and transition metals, such as Ti, V, Cr, Mn, Fe, Co, Ni, Cu, Zn, Ga, Y, Zr, Nb, In, Sn, Ce, Sm, Hf, Ta, W, Re and Pb. Among the above metals, Ti, Fe, In and Sn are used more frequently. The precursor of the metal oxide may be selected from the group consisting of inorganic metal salts and mixtures of inorganic metal salt and organometallic complex. Among the above materials, metal chloride and mixtures of metal chloride and metal alkoxide are used more frequently. The inorganic metal salts may include $TiCl_4$, $Ti(SO_4)_2$, $TiOSO_4$, $VOCl_3$, $FeCl_3$, $Fe(NO_3)_3$, $CoCl_2$, $NbCl_5$, $SnCl_4$, $WCl_6$ and $Pb(NO_3)_2$. The organometallic complex may be selected from the group consisting of $Ti(OEt)_4$, $Ti(OnPr)_4$, $Ti(OiPr)_4$, $Ti(OnBu)_4$, $Fe(acac)_3$, $Cu(CH_3OO)_2$, $Zn[OC(C_2H_5)_3]_2$, $Zr(OnPr)_4$, $Zr(OtBu)_4$, $Zr(OiPr)_4$, $Nb(OEt)_5$, $In(acac)_3$, $Sn(OtBu)_4$ and $Pb(acac)_2$. If the metal oxide nano-particles are intended to contain two or more metal oxides, respective precursors of the two or more metal oxides must be uniformly dispersed in the solvent.

The solvent used in the reaction may be an organic solvent selected from the group consisting of alcohols, ketones, ethers and aldehydes. Examples of the alcohols include benzyl alcohol, ethylene glycol, ethanol, methanol and n-butyl alcohol. Examples of the ketones include acetone, 2-butanone, 3-pentanone, acetophenone, benzophenone and cyclohexanone. Examples of the ethers include diethyl ether, THF and dimethoxy ethane. Examples of the aldehydes include benzaldehyde and butyraldehyde. The above solvent may not only serve as a solvent for dispersion but also act as an oxygen source. When the precursor of metal oxide contains no oxygen source, for example, when only a metal chloride is employed as the precursor of metal oxide, a solvent (e.g., an alcohol) capable of serving as an oxygen source may be used, or an extra material that can serve as an oxygen source, such as titanium isopropoxide or other oxygen containing organometallic complex, is added.

During the solution heating, the reacting system generates a by-product capable of initiating the precursor of the polymer to be polymerized. When the by-product is an acid, the precursor of the polymer may be selected from saccharides and other organic compounds polymerizable in suitable conditions. The saccharides include monosaccharides, disaccharides and polysaccharides. The monosaccharides include fructose and glucose, etc., the disaccharides include sucrose, etc., and the polysaccharides include starch, etc. Other organic compounds polymerizable in suitable conditions include furfuryl alcohol, etc.

In addition, if the carbon-coated metal oxide nano-particles are intended to be doped with heteroatoms, for example, carbon, nitrogen, phosphorous, sulfur and/or other metal elements, a dopant precursor is uniformly dispersed in the solvent together with the precursor of the metal oxide and the precursor of the polymer. The dopant precursor may be selected from the group consisting of precursors of non-metal dopants and precursors of metal dopants. The precursors of metal dopants may include elemental metals, inorganic metal salts and organometallic complexes. The elemental metals may include Ba, Li and Sr. The inorganic metal salts may include $TiCl_4$, $Ti(SO_4)_2$, $TiOSO_4$, $VOCl_3$, $FeCl_3$, $Fe(NO_3)_3$, $CoCl_2$, $NbCl_5$, $SnCl_4$, $WCl_6$, $Pb(NO_3)_2$, $H_2PtCl_6$ and $RuCl_3$. The organometallic complexes may include $Ti(OEt)_4$, $Ti(OnPr)_4$, $Ti(OiPr)_4$, $Ti(OnBu)_4$, $Fe(acac)_3$, $Cu(CH_3OO)_2$, $Zn[OC(C_2H_5)_3]_2$, $Zr(OnPr)_4$, $Zr(OtBu)_4$, $Zr(OiPr)_4$, $Nb(OEt)_5$, $In(acac)_3$, $Sn(OtBu)_4$ and $Pb(acac)_2$. The precursors of non-metal dopants may include non-metal elements and non-metal compounds. The non-metal elements may include iodine and sulfur. The non-metal compounds may include acetic acid, $H_3PO_4$, $H_3PO_3$, $H_3PO_2$, $HIO_3$, $NH_4F$, HF, $CO(NH_2)_2$ and $CS(NH_2)_2$.

Next, the solution is heated to cause reaction, so as to form polymer-coated metal oxide nano-particles (step 104). For example, when the precursor of metal oxide is $TiCl_4$ and the solvent is benzyl alcohol, $TiCl_4$ is reacted with benzyl alcohol to form TiO$_2$ nano-particles as the solution is heated to a temperature of 40-100° C. The by-products of this reaction include C$_6$H$_5$CH$_2$Cl and HCl.

During the solution heating, the reacting system generates a by-product capable of initiating polymerization of the precursor of the polymer, so that the precursor is polymerized on each of the just formed metal oxide nano-particles to form a uniform polymer coating. For example, the reaction of TiCl$_4$ with an alcohol forms HCl, which can initiate polymerization of a monosaccharide, a disaccharide, a polysaccharide or furfuryl alcohol serving as the precursor of the polymer.

Next, the polymer-coated metal oxide nano-particles are separated (step 106). The method may include simple steps like filtering, washing and drying steps.

Afterward, pyrolysis is conducted to carbonize the polymer coated on the metal oxide nano-particles, so as to form carbon-coated metal oxide nano-particles (step 108). The pyrolysis process may be performed in a high vacuum or an inert environment with an environmental gas selected from N$_2$, He and Ar, at a pressure of $10^{-5}$-$10^{-1}$ atm and a temperature of 300-1500° C. The pyrolysis process may last for about 30-120 minutes.

EXAMPLE

In this example, the precursor of the metal oxide was TiCl$_4$, the precursor of the polymer was fructose and the solvent was benzyl alcohol also serving as an oxygen source. The process of forming polymer-coated TiO$_2$ nano-particles is described below. First, 0.87 g of TiCl$_4$ and 0.342 g of fructose were added into 10 ml of benzyl alcohol and uniformly mixed. Next, the reaction solution was heated at 80° C. for 24 hours to form polymer-coated TiO$_2$ nano-particles. Then, a pyrolysis process was performed in vacuum at a temperature of 300° C., 500° C., 700° C., 800° C. or 900° C. under a pressure of $10^{-2}$ atm for 120 minutes, so as to form carbon-coated TiO$_2$ nano-particles.

Figure 2:
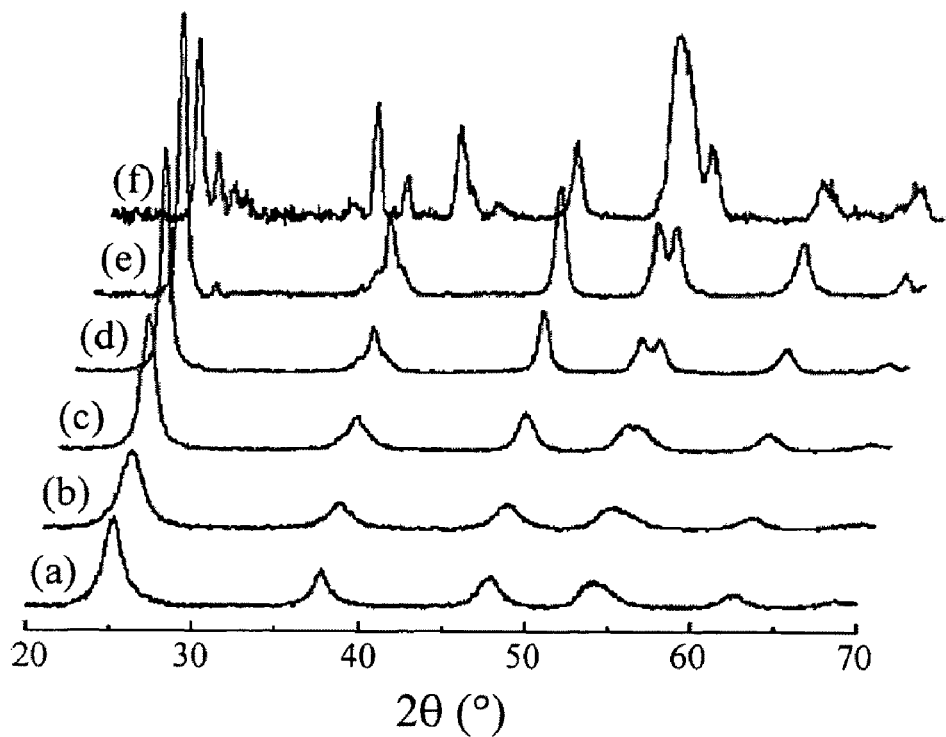
FIG. 2 shows respective X-ray powder diffraction spectra of the just formed polymer-coated $TiO_2$ nano-particles (a) and several carbon-coated $TiO_2$ nano-particle samples respectively obtained with pyrolysis at 300° C. (b), 500° C. (c), 700° C. (d), 800° C. (e) or 900° C. (f) in an inert environment, in an example of this invention.

FIG. 2 shows respective X-ray powder diffraction spectra of the just formed polymer-coated TiO$_2$ nano-particles (a) and several carbon-coated TiO$_2$ nano-particles respectively obtained with pyrolysis at 300° C. (b), 500° C. (c), 700° C. (d), 800° C. (e) or 900° C. (f) in an inert environment, in the example of this invention.

As shown in FIG. 2(*a*), the just formed polymer-coated TiO$_2$ nano-particles had a pure anatase phase, i.e., a catalytically active phase of TiO$_2$. As shown in the figure, even when the pyrolysis temperature was raised to 900° C., the TiO$_2$ nano-particles still had the anatase phase.

Figure 3:
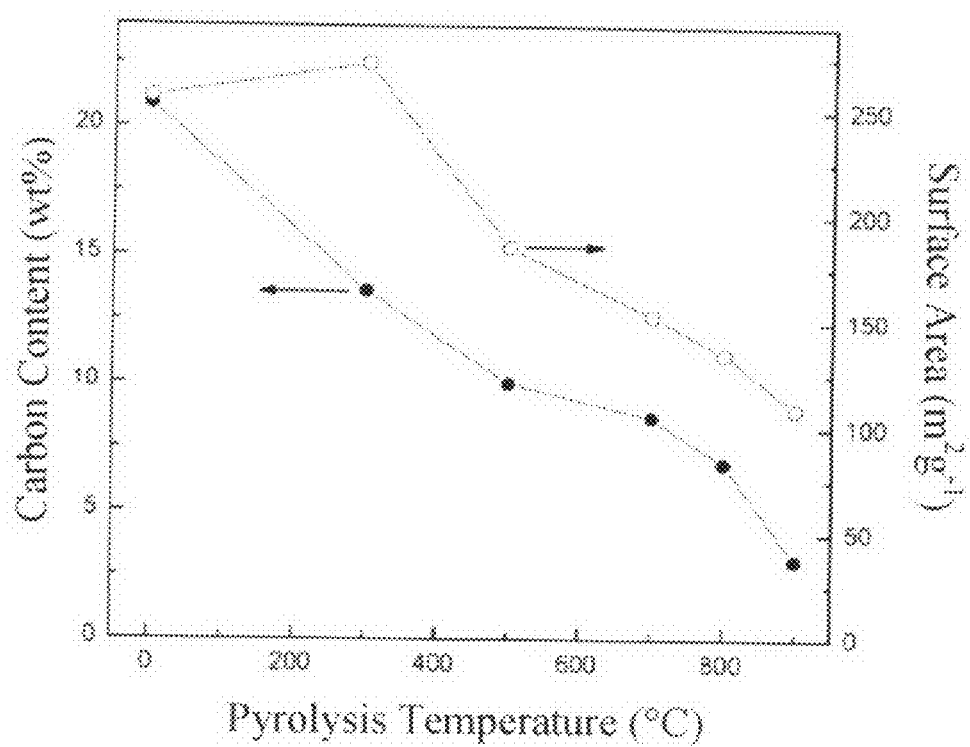
FIG. 3 shows respective variations of the carbon content and the surface area of the polymer/carbon-coated $TiO_2$ nano-particles obtained in the example of this invention with the pyrolysis temperature.

FIG. 3 shows the variations of the carbon content and the surface area of the polymer/carbon-coated TiO$_2$ nano-particles obtained in the example of this invention with the pyrolysis temperature. As shown in FIG. 3, when the pyrolysis temperature was raised from 300° C. to 900° C., the carbon content dropped from 13 wt % to 3 wt % and the surface area was reduced from 270 m$^2$g$^{-1}$ to 110 m$^2$g$^{-1}$. However, as compared with commercial TiO$_2$ nano-particles, such as P25 with a surface area of about 91 m$^2$g$^{-1}$, the surface area of 110 m$^2$g$^{-1}$ is still quite high.

Figure 4:
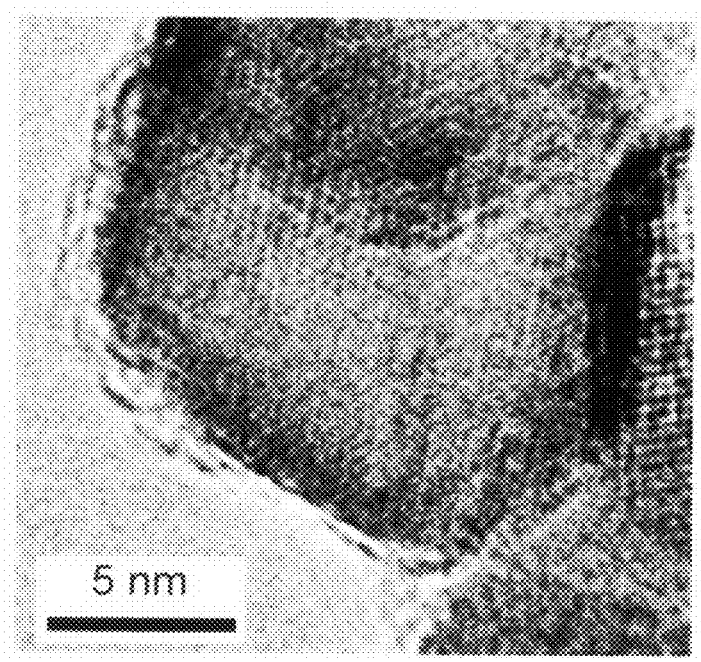
FIG. 4 is a transmission electron microscope (TEM) picture of the carbon-coated $TiO_2$ nano-particles obtained with pyrolysis at 800° C. in the example of this invention.

FIG. 4 is a transmission electron microscope (TEM) picture of the carbon-coated TiO$_2$ nano-particles obtained with pyrolysis at 800° C. in the example of this invention. The TEM picture clearly shows TiO$_2$ nano-particles having the anatase crystal phase with a size of about 15 nm as well as the carbon coating thereon with a uniform thickness. The carbon-coated TiO$_2$ nano-particles with the highly crystalline anatase phase, a uniform carbon coating and a large surface area were then tested for the performances in adsorption and photodegradation, wherein the target was methylene blue that represented organic pollutants.

Figure 5:
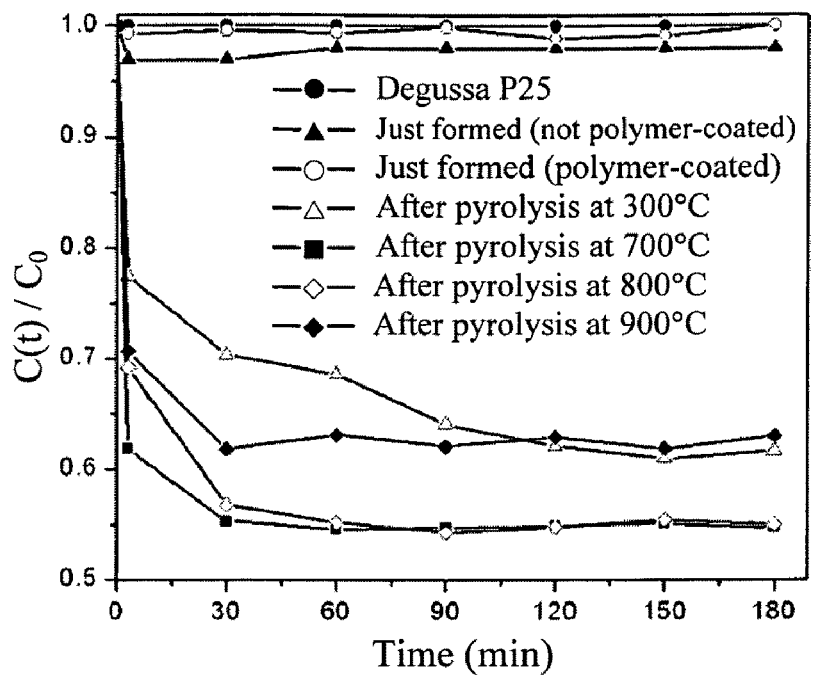
FIG. 5 shows the performances in adsorbing methylene blue of each polymer/carbon-coated $TiO_2$ nano-particle sample obtained in the example of this invention and a commercial nano-photocatalyst Degussa P25.

FIG. 5 shows the performances in adsorbing methylene blue of each polymer/carbon-coated TiO$_2$ nano-particle sample obtained in the example of this invention and a commercial nano-photocatalyst Degussa P25, wherein C$_0$ and C(t) respectively mean the initial concentration and the concentration at time "t". As shown in FIG. 5, the adsorption ratio of the carbon-coated TiO$_2$ nano-particles of this invention obtained with pyrolysis at 800° C. exceeded 45% at most, while the adsorption ratios of Degussa P25 and those not coated by polymer or carbon were close to 0.

Figure 6:
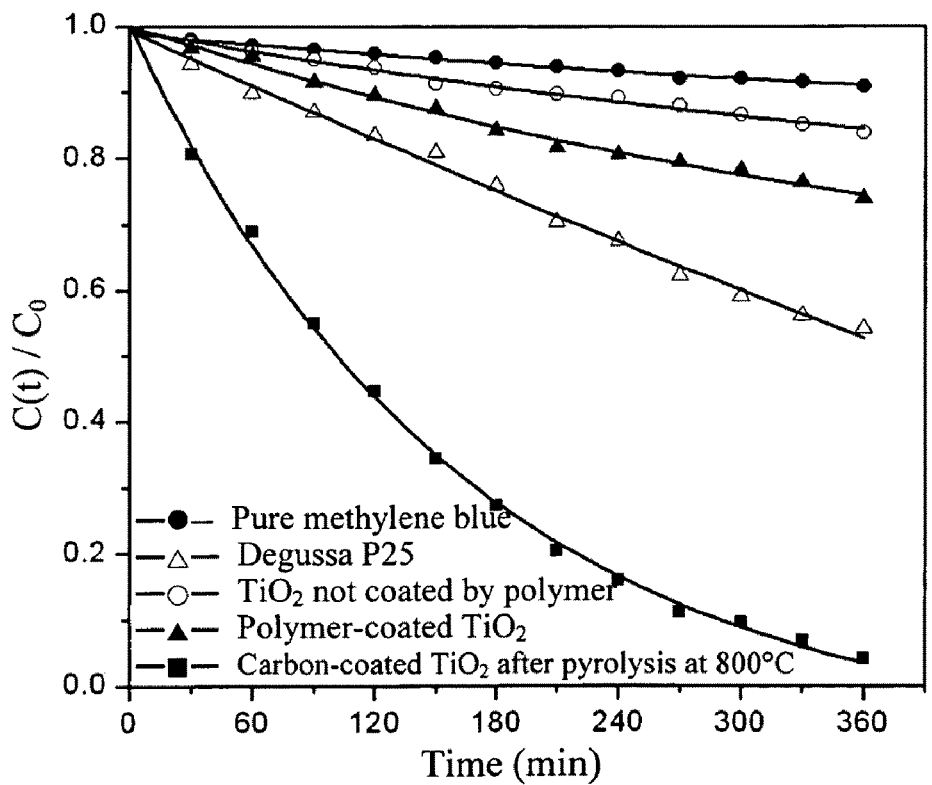
FIG. 6 shows the performances in photodegrading methylene blue of each polymer/carbon-coated $TiO_2$ nano-particle sample obtained in the example of this invention and Degussa P25 under the same illumination condition.

FIG. 6 shows the performances in photodegrading methylene blue of each polymer/carbon-coated TiO$_2$ nano-particle sample obtained in the example of this invention and Degussa P25 under the same illumination condition, wherein C$_0$ and C(t) respectively mean the initial concentration and the concentration at time "t". As shown in FIG. 6, the carbon-coated TiO$_2$ nano-particles of this invention obtained with pyrolysis at 800° C. decomposed more than 70% of methylene blue within 180 minutes, and Degussa P25 only decomposed about 25% of methylene blue in the same period. Accordingly, the photodegradation performance of the carbon-coated TiO$_2$ nano-particles of this invention is mush higher than that of Degussa P25.

This invention has been disclosed above in the embodiments, but is not limited to those. It is known to persons skilled in the art that some modifications and innovations may be made without departing from the spirit and scope of this invention. Hence, the scope of this invention should be defined by the following claims.

What is claimed is:

1. A method of preparing carbon-coated metal oxide nano-particles, comprising:
   reacting a precursor of the metal oxide into metal oxide nano-particles, wherein the reaction produces a by-product that initiates polymerization of a precursor of a polymer on the just-formed metal oxide nano-particles to form polymer-coated metal oxide nano-particles, wherein the metal oxide contains one or more metals; and
   performing a pyrolysis process to carbonize the polymer on the metal oxide nano-particles.

2. The method of claim 1, wherein forming the polymer-coated metal oxide nano-particles comprises:
   uniformly dispersing the precursor of the metal oxide and the precursor of the polymer in a solvent to form a solution; and
   heating the solution to cause the reaction and the polymerization;
   the method further comprising:
   separating the polymer-coated metal oxide nano-particles from the solution after the polymer-coated metal oxide nano-particles are formed.

3. The method of claim 2, wherein the solvent is an organic solvent selected from the group consisting of alcohols, aldehydes, ketones and ethers.

4. The method of claim 2, further comprising uniformly dispersing a dopant precursor in the solvent together with the precursor of the metal oxide and the precursor of the polymer, such that the carbon-coated metal oxide nano-particles prepared are doped with heteroatoms, wherein the dopant precursor is selected from the group consisting of precursors of non-metal dopants and precursors of metal dopants.

5. The method of claim 4, wherein the precursors of metal dopants include elemental metals, inorganic metal salts and organometallic complexes.

6. The method of claim 5, wherein the elemental metals include Ba, Li and Sr.

7. The method of claim 5, wherein the inorganic metal salts include $TiCl_4$, $Ti(SO_4)_2$, $TiOSO_4$, $VOCl_3$, $FeCl_3$, $Fe(NO_3)_3$, $CoCl_2$, $NbCl_5$, $SnCl_4$, $WCl_6$, $Pb(NO_3)_2$, $H_2PtCl_6$ and $RuCl_3$.

8. The method of claim 5, wherein the organometallic complexes include $Ti(OEt)_4$, $Ti(OnPr)_4$, $Ti(OiPr)_4$, $Ti(OnBu)_4$, $Fe(acac)_3$, $CU(CH_3OO)_2$, $Zn[OC(C_2H_5)_3]_2$, $Zr(OnPr)_4$, $Zr(OtBu)_4$, $Zr(OiPr)_4$, $Nb(OEt)_5$, $In(acac)_3$, $Sn(OtBu)_4$ and $Pb(acac)_2$.

9. The method of claim 4, wherein the precursors of non-metal dopants include non-metal elements and non-metal compounds.

10. The method of claim 9, wherein the non-metal elements include iodine and sulfur.

11. The method of claim 9, wherein the non-metal compounds include acetic acid, $H_3PO_4$, $H_3PO_3$, $H_3PO_2$, $HIO_3$, $NH_4F$, $HF$, $CO(NH_2)_2$ and $CS(NH_2)_2$.

12. The method of claim 1, wherein the by-product is an acid.

13. The method of claim 12, wherein the precursor of the polymer is selected from saccharides and furfuryl alcohol.

14. The method of claim 1, wherein the metal is selected from the group consisting of main group metals and transition metals.

15. The method of claim 1, wherein the precursor of the metal oxide is selected from the group consisting of inorganic metal salts and mixtures of inorganic metal salt and organometallic complex.

16. The method of claim 15, wherein the inorganic metal salts include $TiCl_4$, $Ti(SO_4)_2$, $TiOSO_4$, $VOCl_3$, $FeCl_3$, $Fe(NO_3)_3$, $CoCl_2$, $NbCl_5$, $SnCl_4$, $WCl_6$ and $Pb(NO_3)_2$.

17. The method of claim 15, wherein the organometallic complex is selected from the group consisting of $Ti(OEt)_4$, $Ti(OnPr)_4$, $Ti(OiPr)_4$, $Ti(OnBu)_4$, $Fe(acac)_3$, $Cu(CH_3OO)_2$, $Zn[OC(C_2H_5)_3]_2$, $Zr(OnPr)_4$, $Zr(OtBu)_4$, $Zr(OiPr)_4$, $Nb(OEt)_5$, $In(acac)_3$, $Sn(OtBu)_4$ and $Pb(acac)_2$.

18. The method of claim 1, wherein the pyrolysis process is performed in a high vacuum or an inert environment.

19. The method of claim 18, wherein an environmental gas in the inert environment is selected from $N_2$, He and Ar.

20. The method of claim 18, wherein the pyrolysis process is performed under a pressure of $10^{-5}$-$10^{-1}$ atm at a temperature of 300-1500° C.

21. The method of claim 1, wherein a carbon content of the carbon-coated metal oxide nano-particles is in a range of 0.1-20 wt %.

22. The method of claim 1, wherein a surface area of the carbon-coated metal oxide nano-particles is in a range of 30-300 $m^2g^{-1}$.

23. The method of claim 1, wherein the carbon-coated metal oxide nano-particles are used as a photocatalyst.

* * * * *